United States Patent [19]

Cibié

[11] Patent Number: 4,532,447
[45] Date of Patent: Jul. 30, 1985

[54] ROTARY ELECTRIC MACHINE FORMING MORE ESPECIALLY A SPEED VARIATOR OR A TORQUE CONVERTER

[76] Inventor: Pierre Cibié, 145 Avenue du Roule, 92200 Neuilly sur Seine, France

[21] Appl. No.: 522,151
[22] PCT Filed: Nov. 18, 1982
[86] PCT No.: PCT/FR82/00194
§ 371 Date: Jul. 21, 1983
§ 102(e) Date: Jul. 21, 1983
[87] PCT Pub. No.: WO83/02043
PCT Pub. Date: Jun. 9, 1983

[30] Foreign Application Priority Data

Nov. 25, 1981 [FR] France ................. 8122080

[51] Int. Cl.³ .............................. H02K 16/00
[52] U.S. Cl. ................. 310/114; 310/68 R; 310/49 R; 336/123; 336/131
[58] Field of Search ............. 310/112–117, 310/49 R, 126, 179, 180, 184, 185, 194, 195, 216, 254, 261, 265–267, 67 R, 68 R; 318/560, 618, 638, 647, 650, 652, 653, 654, 656, 197, 659–661, 690, 692, 205; 336/115, 123, 131, 170

[56] References Cited

U.S. PATENT DOCUMENTS

| | | | |
|---|---|---|---|
| 1,266,303 | 5/1918 | Neuland | 310/114 X |
| 1,491,441 | 4/1924 | Thompson | 310/114 |
| 1,620,747 | 3/1927 | Allison | 310/115 UX |
| 1,675,960 | 7/1928 | Schon et al. | 310/114 X |
| 1,913,211 | 6/1933 | Prince | 310/115 X |
| 1,913,371 | 6/1933 | Cleaver | 310/115 X |
| 1,977,950 | 10/1934 | Morhard | 310/267 X |
| 2,666,174 | 1/1954 | Pestarini | 310/114 X |
| 2,762,939 | 9/1956 | Hodgson | 310/115 X |
| 2,864,017 | 12/1958 | Waltscheft | 310/115 X |
| 2,903,641 | 9/1959 | Roe | 310/115 X |
| 3,683,249 | 8/1972 | Shibata | 318/205 |
| 3,728,600 | 4/1973 | Shibata | 318/205 |

FOREIGN PATENT DOCUMENTS

| | | |
|---|---|---|
| 824850 | 2/1938 | France . |
| 1438037 | 3/1966 | France . |
| 2042795 | 2/1971 | France . |
| 481157 | 3/1938 | United Kingdom . |

*Primary Examiner*—Mark O. Budd
*Attorney, Agent, or Firm*—Scully, Scott, Murphy & Presser

[57] ABSTRACT

The invention relates to a rotary electric machine able to be used as a speed variator and/or a torque converter. It comprises a stator with s pairs of poles, a central rotor (RM) with p pairs of poles and an intermediate rotor (RT) comprising, at its inner face, at least one primary electric circuit subjected to the field of the central rotor (RM) and, at its outer face, at least one secondary electric circuit subjected to the stator field. A switching circuit controls the passage, through the secondary circuit, of the current produced in the primary circuit, in a direction such that the torque exerted by the stator (F) on the rotor (RT) is in the same direction.

13 Claims, 8 Drawing Figures

ROTARY ELECTRIC MACHINE FORMING MORE ESPECIALLY A SPEED VARIATOR OR A TORQUE CONVERTER

The invention relates to rotary electric machines.

Rotary electric machines are already known forming a speed variator (Electron-Auxilec sold in France by the Thomson-Lucas company). The variation of speed is obtained therein by slipping with a substantially constant torque. Although capable of giving reliable service, these machines have the disadvantage of poor efficiency, at best equal to $N_2/N_1$, $N_1$ being the input speed and $N_2$ the output speed.

The invention has more particularly as aim to provide a torque converter at the same time as a speed variator with an efficiency very much greater than that of the previously mentioned machines, more especially at high reduction ratios. It proposes, to this end, a machine comprising, in combination:

a stator F with s pole pairs, a central rotor RM with p pole pairs, an intermediate rotor RT comprising two series of axial notches, namely a series of inner notches in each of which passes at least one primary conductor subjected to the rotor field RM and a series of external notches in each of which passes at least one secondary conductor subjected to the stator field F, and an electric circuit providing the connection between the primary conductors and the secondary conductors, this circuit comprising at least one switching device controlling the passage through the secondary conductors of the current induced in the primary conductors, in a direction such that the torque exerted by stator F on rotor RT is in the same direction, in general in the direction of the torque exerted by the central rotor RM on the intermediate rotor RT.

In a first embodiment of the invention, the intermediate rotor comprises two pairs of notches, each pair of which is formed, on the same radius, by an internal notch on the rotor RM side and an external notch on the stator F side. Each pair of notches houses a winding whose external strands are intended to be subjected to the stator F field and whose internal strands are intended to be subjected to the field of the central rotor RM. Each winding is closed by a switching device comprising at least two unidirectional conducting switches, mounted on the intermediate rotor so as to let the current pass respectively in one direction or the other in the winding, and this in a controlled way as a function of the direction of the stator field to which the winding is subjected.

In this case, the number s of stator poles is 3, 4 or 6, the central rotor comprises p=6 to 10 pole pairs and the intermediate rotor comprises q pairs of notches, q being advantageously a multiple of the number of poles, i.e. 2p, for example $3 \times 2 \times p$.

In another embodiment of the invention, the inner and outer notches of the intermediate rotor are respectively provided with separate inner and outer windings.

In this case, the inner winding of the intermediate rotor RT may be wound in the manner of a conventional three-phase winding, whereas the outer winding may comprise several circuits each comprising in series several coils in phase with respect to the poles of the stator. The three-phase current, generated inside the three-phase winding, may be rectified then transmitted to the coils of the outer winding through a switching device controlled as a function of the position of the intermediate rotor with respect to the stator.

In the previously described embodiments, the switching device may consist of unidirectional control switches able to be controlled by a current of low strength, such as transistors or thyristors. The control of these switches may be accomplished from a sensor detecting the position of the rotor RT, with respect to stator F, or to the field resulting from the coils energizing the stator F and the armature reaction produced in the intermediate rotor RT. Hall effect components may be advantageously used for this purpose.

Moreover, according to one advantageous aspect of the invention, stator F arranged as a DC motor stator with parallel energization comprises projecting poles and the central rotor RM, arranged as a motor vehicle alternator rotor, comprises housed poles.

Furthermore, the machine may comprise means for selectively varying the energization of stator F with respect to energization of the central rotor RM.

In an interesting variant of the invention, said switching devices comprise at least two pairs of unidirectional conducting members, mounted as a bridge, whose two opposite ends are connected to the ends of the winding of the intermediate rotor which is associated therewith, whereas the other two ends of the bridge are connected to rings, adapted to receive by means of removable brushes a DC supply voltage; this allows the machine to operate as a starter motor on board a motor vehicle (the control of the switching devices then taking place as a function of the position of the central rotor with respect to the intermediate rotor). Operation as a torque converter is then provided by short-circuiting the brushes and by controlling the switching devices as a function of the position of the intermediate rotor with respect to the stator.

Other features and advantages of the invention will appear from reading the following detailed description which gives, by way of non limiting example, different embodiments of the invention with reference to the drawings in which:

FIG. 1 illustrates schematically the general structure of the proposed rotary machine.

The electric part of this machine is cylindrical in revolution, over a length L.

Its fixed stator F comprises four pairs of projecting poles. To simplify the drawings, only a North pole FN1 and an adjacent South pole FS1 have been shown. Constructed in the manner of a conventional DC motor stator, this stator receives shunt type energization.

Shaft AM is driven externally, by means of an internal combustion engine for example. On this shaft AM is fitted a central rotor RM (or mu rotor), constructed as a conventional alternator rotor for a motor vehicle. The central rotor RM here comprises eight pairs of coiled poles, partially illustrated, (P1, P'1, P2 etc.). Energization of this alternator type rotor RM is provided at the end of shaft AM.

Figure 1:
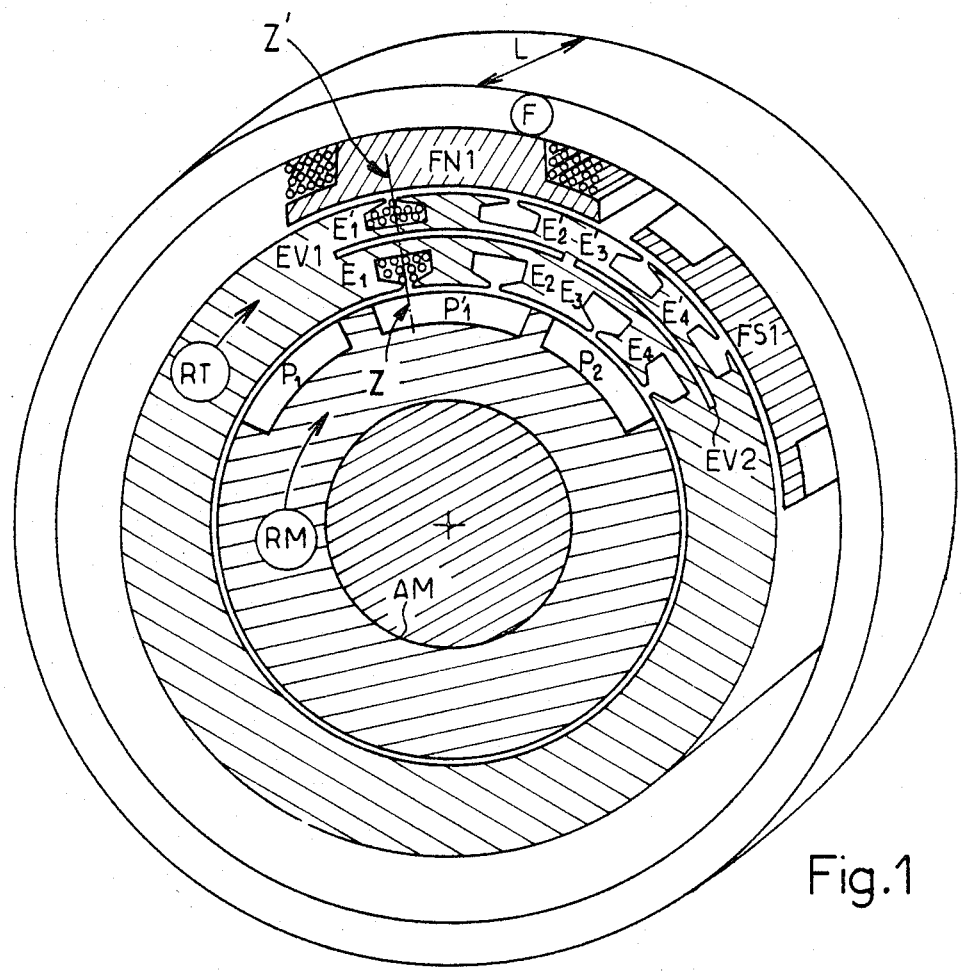
FIG. 1 illustrates schematically the general structure of the machine in accordance with the invention.
Figure 2:
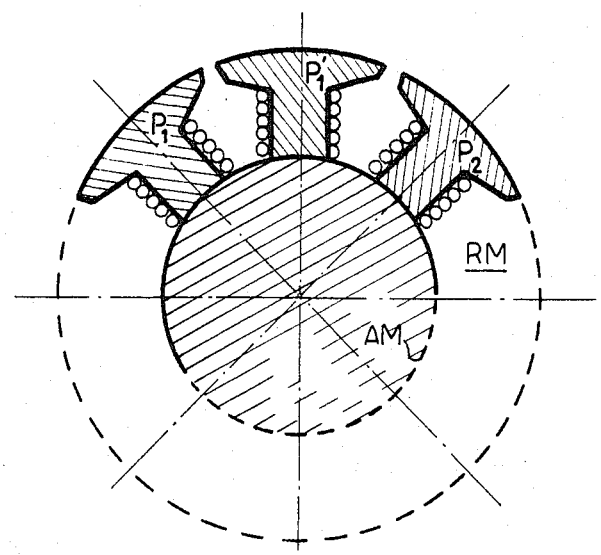
FIG. 2 shows schematically, in cross section, another possible embodiment of the central rotor RM of the machine illustrated in FIG. 1.

It should be noted that in the case where the machine is intended for high power use, rotor RM may comprise projecting poles wound as shown in FIG. 2.

Coaxially with respect to shaft AM, and between the external stator F and the central rotor RM, is provided an intermediate rotor RT (or motion transmitting rotor). This rotor RT is a ring made from laminated metal sheet, integral with a hollow shaft coaxial with shaft AM, but not shown.

It comprises on the same radius an internal notch $E_1$ and an external notch $E'_1$. 24 pairs of notches of this kind are provided, evenly spaced apart about the intermediate rotor RT (only a part of these notches is shown, for the sake of clarity. Preferably, axial recesses appearing in section as arcs of a circle, are formed between the internal notches such as $E_1$ and $E_2$ and the homologous external notches, such as $E'_1$ and $E'_2$, respectively. Two of these recesses are shown at EV1 and EV2.

Figure 3:
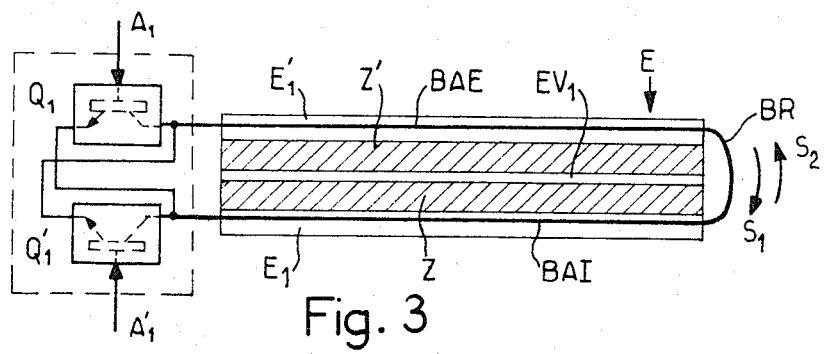
FIG. 3 illustrates one method of controlling the conduction switching of a coil of the intermediate rotor of the machine shown in FIG. 1.

Two homologous notches, $E_1$ and $E'_1$ for example, receive a coil E each turn of which is defined by a main external axial strand of length L, another main internal strand, also axial and of length L, and radial connecting strands at both ends of the intermediate rotor. The coil is open at one of the ends of the intermediate rotor RT. In FIG. 3, it has been assumed, for the sake of simplicity, that this coil is reduced to a single turn, with an external axial strand BAE, a radial connecting strand BR and an internal axial strand BAI.

In the left-hand part of FIG. 3 appear the respective free ends of strands BAE and BAI. These free ends are connected to the power conducting mesh of two unidirectional conducting switches Q1 and Q'1 mounted on rotor RT. These switches are disposed so that one, when so ordered, allows the current to pass in one direction, and the other in the other direction through the coil shown schematically in FIG. 3 by the turn BAE, BR, BAI. These switches may be formed by transistors as shown with broken lines. The free end of BAE is connected to the collector of transistor Q'1 and to the emitter of transistor Q1 (both of NPN type); conversely, the free end of BAI is connected to the collector of Q1 and to the emitter of Q'1. Control of transistors Q1 and Q'1 (arrows A1 and A'1) is provided from a sensor detecting the position of rotor RT with respect to stator F. The low power control signal may be advantageously obtained from the field resulting from the energizing coils FN and FS and the armature reaction produced in the intermediate rotor. This signal may, for example, be produced by means of a conventional Hall effect component.

It is clear that, in the case where the two unidirectional conductors Q1 and Q'1 are enabled (passing state), the current flowing in the turns of rotor RT will have a sinusoidal trend of frequency $p \times N_2$, in which expression p is the number of pairs of the central rotor and $N_2$ is the difference in speed between the speed $N_0$ of the central rotor RM and the speed $N_1$ of the intermediate rotor, i.e. $N_2 = N_0 - N_1$. This is the arrangement used when it is desired to transmit a torque RT=RM, with the lowest possible slipping. The efficiency is then equal to $N_1/N_0$. This result may more especially be obtained in the absence of energization of the coils of stator F.

On the other hand, in the case where the coils of stator F are energized, when the position sensor is for example under the pole FN, it will control the flow of the current in the corresponding coil E in the direction $S_1$ (conductor Q1 being enabled and conductor Q'1 being disabled). Conversely, when this position sensor is under pole FS, it will control the flow of the current in direction $S_2$. Of course, the direction of conduction of the unidirectional conductors Q1 and Q'1 will be provided so that the direction of the current released in coil E corresponds to that which causes the rotor RT to function as a motor.

Figure 4:
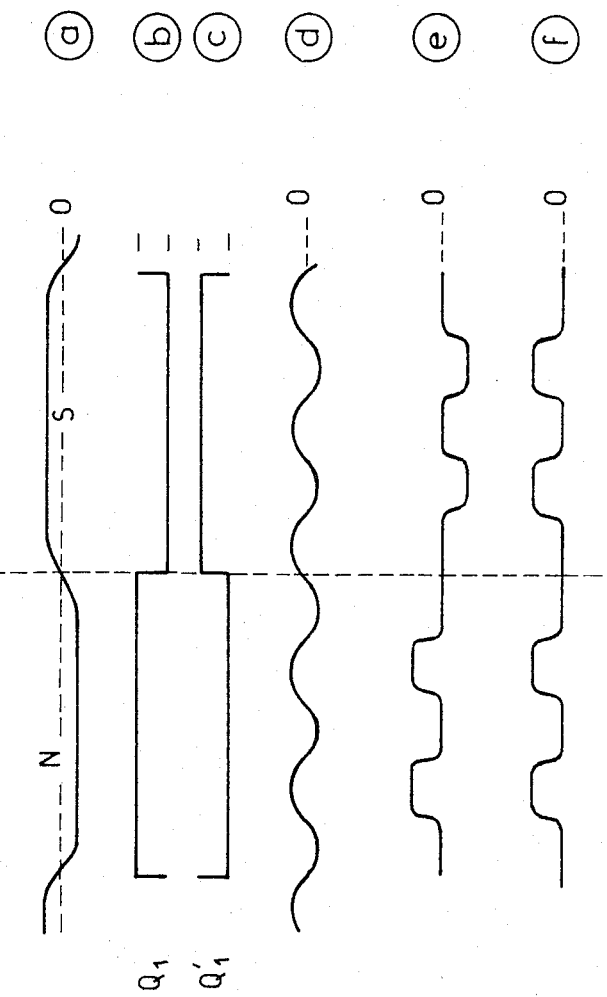
FIG. 4 is a timing diagram which shows schematically the operation of the proposed machine.

The previously described operating mode is illustrated in FIG. 4 in which there are shown:

at 4a, a spatial period of the stator field;

at 4b, the conduction of transistor Q1 while the stator field is of North polarity;

at 4c, the conduction of transistor Q'1 while the stator field is of South polarity;

at 4d, one example of the form of the field due to the central rotor RM (the periodicity of this field with respect to the stator field depends of course on the speed at which RM is driven);

at 4e, the current induced in RT by this field and due to RM, for example a positive current—for the positive half-waves of the field RM—when Q1 is conducting, and on the contrary a negative current (negative half-waves of the field RM) when it is Q'1 which is conducting, finally, at 4f, the torque exerted on RT following the interaction RM-Rt; it will be noted that the same curve defines also the interaction between the intermediate rotor RT and the stator F (on the external strand side of the coil).

The simple fact that notch E'1 is near the stator and that E1 is near the rotor is sufficient to privilege the E'1-stator (with respect to E1-stator) interaction and the E1-rotor RM (with respect to E'1-rotor RM) interaction. Such being the case, the recesses such as EV1 formed between E1 and E'1 accentuate the difference.

The operation of the machine is then the following:

the field created by the poles of opposite sign (P1, P'1) of RM passes through Z, inner side, then to E1. This field is variable, and the flux which passes through Z goes from $+\phi o$ to $-\phi o$ for each relative rotation of a pair of poles (P1, P'1) between RT and RM. It induces therefore an alternating electromotive force in the coil passing into E1 and E'1. For the half-waves corresponding to the direction of conduction of the transistor which is actuated at that time, a current flows through the coil. The a priori result is a torque exerted by RM on RT; but, with the same current passing through E'1, if the stator is engergized, the result is a torque exerted by F on RT (the arrangement being such that the two torques are of the same direction).

The two torques will add together their effects on the intermediate rotor RT.

More precisely, if the energization of rotor RT is maximum and the energization of stator F is zero, transistors Q1 and Q'1 are disabled and the windings En and E'n (n varying from 1 to 16) are practically short-circuited. In this case, RT will tend to rotate at the same speed as RM, less slipping due to the energy lost in the windings, as well as in the iron of RT; the torque exerted on RT is then solely due to RM. ($C°_T = C°_M$.

now, the speed of RM is increased and stator F is energized. A torque then appears because of the interaction E'n−F. But there occurs at the same time in the coil a counter-electromotive force and the current I which flows through the coil can only be maintained with higher slipping of Rm with respect to RT. The total torque $C_T$ exerted on RT is written:

$$C_T = C_M + C_F$$

If it is a question simply of maintaining torque $C_T$ at value $C°_T$, it can be seen that energization of the stator allows the torque CM supplied by RM to be reduced. (This torque decreases moreover naturally, because the current I in the coils of RT decreases because of the counter-electromotive force of the stator field F). Thus, the speed of RT (driven member) may be adjusted to a value lower than that of RM, by acting on the energization of F. In particular, we may have CM = 1.3 CF and CT = 3.3 CM. The energy lost is that dispersed as heat in RT, either in the iron, or in the windings, or in the transistors Q1 and Q'1.

It will be noted in this connection that if the direction of the flux in stator F is reversed, the transmitting rotor RT rotates in the opposite direction with a torque:

$$C_T = C_F - C_M$$

The machine may then be mounted with the rotor RM coupled to the engine of a motor vehicle, and the rotor RT coupled to the transmission.

Figure 5:
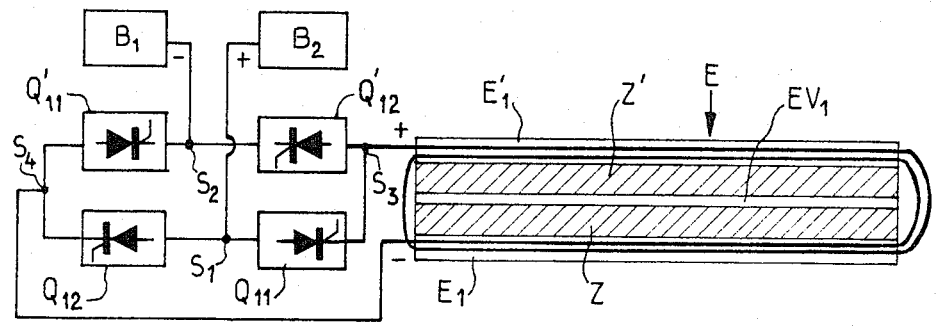
FIG. 5 illustrates one mode of switching a coil of the intermediate rotor, allowing the machine to operate as a starter motor/generator.

In an interesting variant of the invention, the proposed machine may be used as a starter motor for the engine of the motor vehicle and/or as a current generator, more especially for charging the accumulator battery. FIG. 5 illustrates schematically the modifications required for this purpose.

This variant may comprise two current input rings $B_1$, $B_2$ mounted on the end of the shaft of the intermediate rotor RT and on which slide fixed brushes, capable of being raised electromechanically when the machine is not used as a starter motor.

These two rings $B_1$,$B_2$ are respectively connected to a pair of opposite apexes $S_1$, $S_2$ of a unidirectional switching bridge, Q11, Q12, Q'11, Q'12 (represented by thyristors) and the other two apexes $S_3$, $S_4$ of which are connected respectively to the two ends of coil E.

The direction of conduction of these switches, in the enabled state, is the following:
Q11 conducts in the direction $S_1 \rightarrow S_3$
Q12 conducts in the direction $S_1 \rightarrow S_4$
Q'11 conducts in the direction $S_4 \rightarrow S_2$
and Q'12 conducts in the direction $S_3 \rightarrow S_2$ These switches are controlled by means of two separate switchable control circuits, namely:

for operation as a torque converter, a control circuit operating from a sensor detecting the position of the intermediate rotor RT with respect to stator F, and for operation as a starter motor, a control circuit operating from a sensor detecting the position of the central rotor RM with respect to the intermediate rotor RT.

These two control circuits are designed so that, depending on the position of the intermediate rotor RT with respect to stator F or with respect to the central rotor RM, either switches Q11 and Q'11 or switches Q12 and Q'12 will be enabled.

The operation as a starter motor is obtained by placing the brushes on the rings $B_1$ and $B_2$ for supplying them with a + and − DC voltage. The assembly formed by the central rotor RM and the intermediate rotor RT behaves then like a DC electric motor of inversed structure.

Operation as a torque converter is obtained by short-circuiting rings $B_1$ and $B_2$ so as to provide an operation similar to that previously described, in which the two switches Q11 and Q'11 in series play the role of switch Q1 and the switches Q12 and Q'12 in series play the role of switch Q'1. This solution proves advantageous despite the slight increase in ohmic losses due to the fact that two switches are placed in series.

In the previously described examples, a switching device formed by switches Q1,Q'1, or Q11,Q12,Q'11,Q'12 was used for each of the coils E of the intermediate rotor RT. It should be noted that the number of switching devices may be considerably reduced.

In fact, since the number of notches, En, E'n is a multiple of 2p, for example k×2p, p notches are in phase identity and p notches in phase opposition. Therefore, by suitable alternate connection, 2p notches may be placed in series. in this case, k independent switching devices are sufficient.

It will be further noted that, considering the high self induction coefficient of coils E, interruption of the current by the switches will have to take place at the zero flow point of the AC current. This result may be conveniently obtained by using thyristors for the switching elements.

For use as a generator, it is sufficient to take off a part of the rectified current flowing in coils E, during the operation as a torque converter of the machine, by means of brushes applied to two respective rings of the intermediate rotor RT.

In machines such as the one previously described, it is apparent that the conductors of the intermediate rotor are only active for half the time. Now, the ohmic losses are proportional to the square of the instantaneous flowrate. The means values increase then quicker than the mean flowrate, i.e. the torque.

Figure 6:
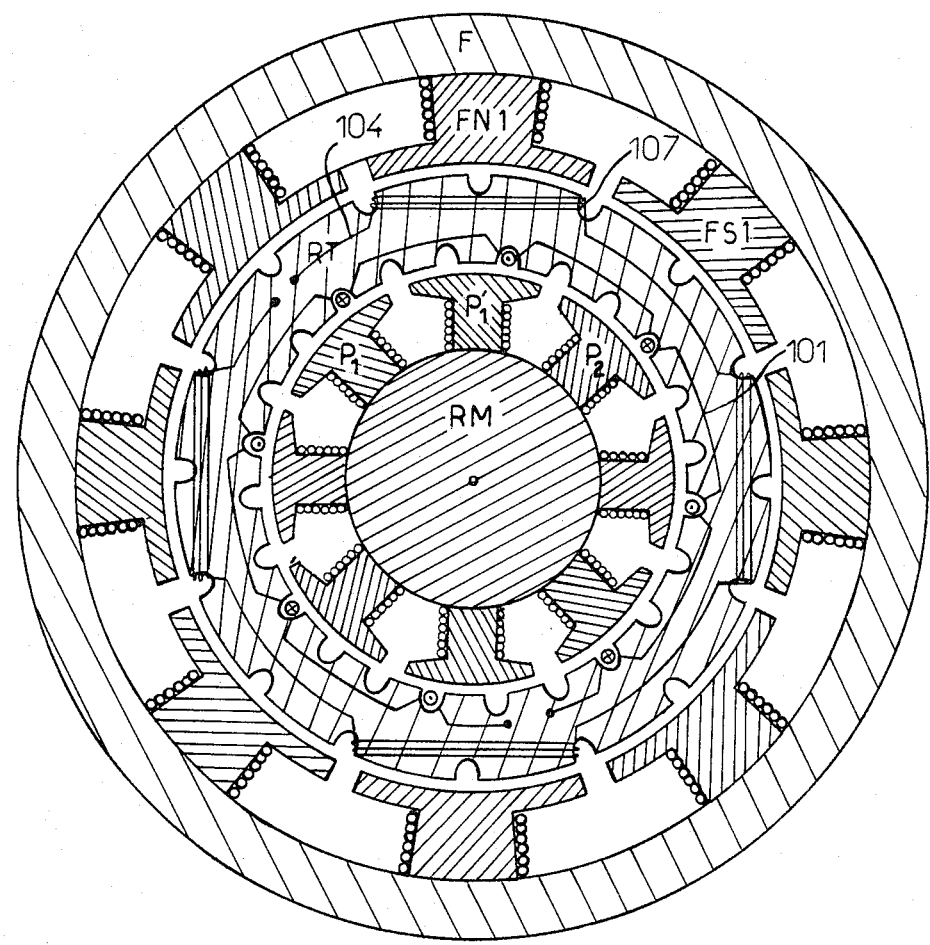
FIG. 6 illustrates schematically the structure of a machine according to another embodiment of the invention.

The variant shown in FIG. 6 overcomes this disadvantage. In this variant, the turns of the intermediate rotor are no longer coiled about $E_1,E'_1$. In fact, in the intermediate rotor three inner notches per pole of the central rotor RM are provided and a conventional three phase winding is effected in these notches. In the example shown, the central rotor RM comprises eight coiled poles and the intermediate rotor comprises consequently 24 inner notches. For the sake of clarity, only a single winding corresponding to a phase has been shown in this drawing, the signs ⊖ and ⊕ showing the direction of the winding. The other windings, not shown, are similarly provided but staggered respectively by one notch.

The number of outer notches is not necessarily the same as that of the inner notches. It depends essentially on the number of pairs of poles of stator F. However, for reasons of convenience, a stator has been shown with four pairs of coiled poles and an intermediate rotor RT comprising 16 outer notches (namely two notches per pole of stator F).

In these notches are wound three circuits each comprising four coils disposed in series and which are in phase with respect to the poles of the stator (in FIG. 6 only one of these circuits has been shown whose windings are disposed to the right of each of the North poles of the stator). The other two circuits are provided similarly but staggered by one notch.

Figures 7, 8:
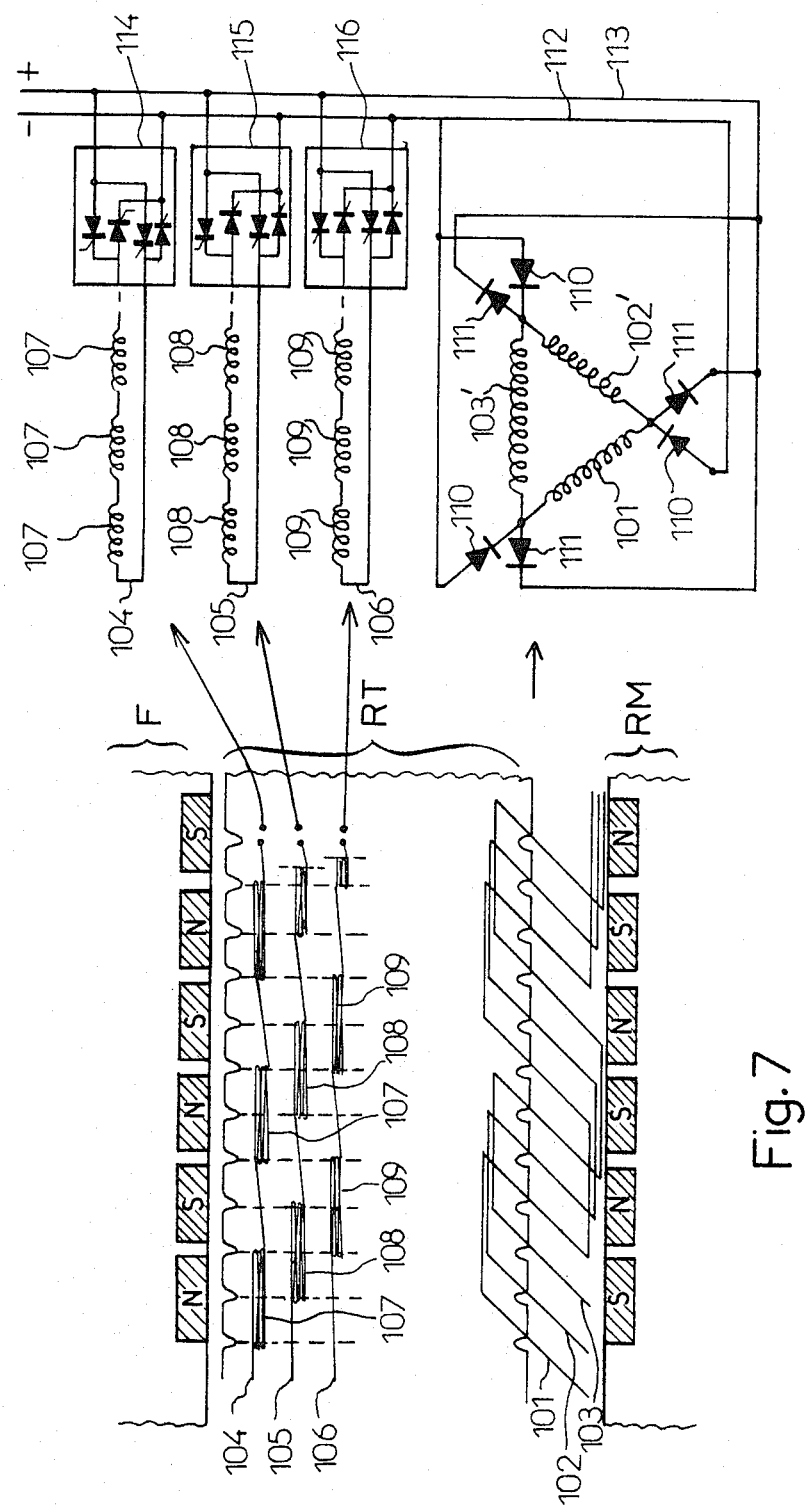
FIG. 7 is a schematical "unwound" representation of the machine, for illustrating the way in which the windings of the intermediate rotor may be formed.
FIG. 8 is an electric diagram of the interconnections of the windings of the intermediate rotor.

FIG. 7 shows schematically, in a partial developed view, the intermediate rotor RT between the central rotor RM and the stator F. This drawing shows the three phase coil mounted in the inner notches of the intermediate rotor RT (wires 101, 102, 103) and the three groups of coils in series 104, 105, 106 (staggered for the sake of clarity) mounted in the outer notches of this same intermediate rotor RT.

As can be seen in FIG. 8, the electric diagram equivalent to the three phase winding consists of a circuit of three windings 101', 102', 103', disposed in a triangle, whereas the circuit equivalent to the winding of the outer notches of the intermediate rotor consists of three independent circuits 104', 105', 106', each comprising four coils in series 107,108,109 (only three of which have been shown for each circuit).

The three phase current produced by coil 101', 102', 103', mounted in the inner notches of the intermediate rotor RT, is rectified by means of a circuit comprising two inverted diodes 110,111 for each of the apexes of the triangle formed by the coils 101', 102', 103' and connected respectively to conductors 112,113 providing the connnection between the inner 101,102,103 and outer 107,108,109 windings of the rotor RT.

These conductors 112,113 supply the three independent circuits 104,105,106 of the outer coil of the rotor RT through a switching circuit 114,115,116 capable of either inverting the flow direction of the current in coils 107,108,109 of the corresponding circuit 104,105,106 as a function of the position of rotor RT with respect to stator F, or of interrupting this current quite simply periodically depending on said position.

It is clear that, in this embodiment, the operation of the machine as a current generator may be easily obtained by connecting the conductors 112 and 113 to two rings mounted on the intermediate rotor RT and on which brushes are in sliding contact.

Moreover, it is recalled that the general principle of the machine of the invention consists in providing, at the level of the internal face of the intermediate rotor RT, one or more primary electric circuits in which, under the effect of the field of the central rotor, an electric current is established and, at the level of the external face of the intermediate rotor, one or more secondary electric circuits, fed in a controlled way (in direction and in switching) from the primary electric circuit(s), the control of the supply to the secondary circuits being effected so that the torque generated by the stator field F on the secondary circuit(s) is added to the torque generated by the field of the central rotor RM on the primary circuit(s).

In the previously described embodiments, two examples of these primary and secondary circuits have been illustrated.

In the embodiment shown in FIGS. 1 to 4, the machine comprises as many primary and secondary circuits as there are pairs of outer-inner notches on the intermediate rotor. The primary circuits are then formed by the conductors of each of coils E passing through the inner notches and the secondary circuits consist of the conductors of each of the coils E passing through the outer notches.

In the embodiment shown in FIGS. 6 to 8, the primary circuits consist of three windings of the three phase coil, whereas the secondary circuits consist of three independent circuits each comprising the four coils connected in series which are in phase with respect to the poles of the stator.

It is clear that the invention is not limited to these embodiments of the primary and secondary circuits of the intermediate rotor RT.

Other types of circuits associated with suitable switching devices may of course be used without departing from the scope of the invention.

I claim:

1. A rotary electric machine comprising in combination:

a stator with s pairs of poles;

a central rotor with p pairs of poles;

an intermediate rotor comprising, at its inner face, at least one primary electric circuit subjected to the field of the central rotor and, at its outer face, at least one secondary circuit subjected to the field of the stator, characterized in that it comprises, incorporated in the intermediate rotor, an electric circuit providing the connection between the primary electric circuit and the secondary electric circuit, this connecting circuit comprising at least one switching device controlling the flow of the current in the secondary circuit, in a direction such that the torque exerted by the stator on the intermediate rotor is in the same direction as the torque exerted by the central rotor on the intermediate rotor, the control of this switching device being provided from at least one sensor detecting the position of the intermediate rotor with respect to the stator or to the field resulting from the energizing coils of the stator and the armature reaction produced in the intermediate rotor, said position sensor being also integrated in said intermediate rotor.

2. A rotary electric machine comprising in combination:

a stator with s pairs of poles;

a central rotor with p pairs of poles;

an intermediate rotor comprising, q pairs of notches each pair of which is formed, on the same radius, by an inner notch, on the rotor side and an outer notch on the stator side, in that each pair of notches houses a coil whose external strands are subjected principally to the stator field and whose internal strands are subjected to the field of the central rotor, and in that each coil is closed on a switching device comprising at least two unidirectional conducting switches mounted on the intermediate rotor for letting the current pass respectively in one direction or in the other through the coil, and this in a controlled way depending on the direction of the stator field to which the coil is subjected, the control of this switching device being provided from at least one sensor detecting the position of the intermediate rotor with respect to the stator or to the field resulting from the energizing coils of the stator and the armature reaction produced in the intermediate rotor, said position sensor being also integrated in said intermediate rotor.

3. A rotary electric machine comprising in combination:

a stator with s pairs of poles;

a central rotor with p pairs of poles;

an intermediate rotor comprising, at its inner face, at least one primary electric circuit subjected to the field of the central rotor and, at its outer face, at least one secondary circuit is subjected to the field of the stator, characterized in that it comprises, incorporated in the intermediate rotor, an electric circuit providing the connection between the primary electric circuit and the secondary electric circuit, this connecting circuit comprising at least one switching device controlling the flow of the current in the secondary circuit, said switching devices consisting of directional control switches controllable by low intensity currents, such as transistors or thyristors, the control of this switching device being provided from at least on sensor detecting the position of the intermediate rotor with respect to the stator or to the field resulting from the energizing coils of the stator and the armature reaction produced in the intermediate rotor, said position sensor being also integrated in said intermediate rotor.

4. The machine according to claim 3, characterized in that the control of said switching devices takes place by means of Hall effect components.

5. The machine according to claim 2 or 3 characterized in that, since the coils are in identity of phase with respect to the poles of the stator, they are connected in series and are controlled by a single switching device.

6. The machine according to claim 2 or 3 characterized in that the outer and inner notches of the intermediate rotor are respectively provided with separate inner and outer windings.

7. The machine according to claim 4, characterized in that the inner winding of the intermediate rotor is wound as a conventional three phase winding, in that the outer winding comprises several circuits each comprising several coils connected in series and which are in phase with respect to the poles of the stator, and in that the three phase current generated inside the three phase winding is rectified, then transmitted to the coils of the outer winding, through a switching device mounted in the rotor and controlled as a function of the position of the intermediate rotor with respect to the stator.

8. The machine according to claims 3 or 4 or 2, characterized in that said switching devices consist of directional control switches controllable by low intensity currents, such as transistors or thyristors.

9. The machine according to claim 8, characterized in that the control of said switching devices takes place by means of Hall effect components.

10. The machine according to one of claims 3 or 2, characterized in that, so as to allow the machine to operate as a starter motor on board a motor vehicle, said switching devices comprise at least two pairs of unidirectional conducting members connected as a bridge, whose two opposite ends are connected to the ends of the winding of the intermediate rotor which is associated therewith, whereas the other two ends of the bridge are connected to a pair of rings capable of receiving, through removable brushes, a DC supply voltage, the control of the switching devices then being effected as a function of the position of the central rotor with respect to the intermediate rotor, and in that, in this case, operation as a torque converter is obtained by short-circuiting the brushes and by controlling the switching devices as a function of the position of the intermediate rotor with respect to the stator.

11. The machine according to claims 2 or 3, characterized in that, for using the machine as a current generator, a fraction of the rectified current induced in the intermediate rotor by the central rotor (RM) is taken off by means of additional rings and brushes, during operation of the machine as a torque converter.

12. The machine according to claims 2 or 3 used as a torque converter on board a motor vehicle, characterized in that the central rotor is coupled to the motor of the vehicle and the intermediate rotor is coupled to the transmission.

13. A rotary electric machine comprising in combination:

a stator with s pairs of poles;

a central rotor with p pairs of poles;

an intermediate rotor comprising, at its inner face, at least one primary electric circuit subjected to the field of the central rotor and, at its outer face, at least one secondary circuit subjected to the field of the stator, characterized in that it comprises, incorporated in the intermediate rotor, an electric circuit providing the connection between the primary electric circuit and the secondary electric circuit, this connecting circuit comprising at least one switching device controlling the flow of the current in the secondary circuit, the control of this switching device being provided from at least one sensor detecting the position of the intermediate rotor with respect to the stator or to the field resulting from the energizing coils of the stator and the armature reaction produced in the intermediate rotor, said position sensor being also integrated in said intermediate rotor, said switching devices comprising at least two pairs of unidirectional conducting members, connected as a bridge, whose two opposite ends are connected to the ends of the winding of the intermediate rotor which is associated therewith, whereas the other two ends of the bridge are connected to a pair of rings capable of receiving, through removable brushes, a DC supply voltage, the control of the switching devices then being effected as a function of the position of the central rotor with respect to the intermediate rotor, and in that, in this case, operation as a torque converter is obtained by short-circuiting the brushes and by controlling the switching devices as a function of the position of the intermediate rotor with respect to the stator, whereby said machine operates as a starter motor of a motor of a motor vehicle.

* * * * *